Sept. 2, 1947.　　　P. VANNINI　　　2,426,801
MECHANISM WITH INTERMITTENT RELEASE OF A DRIVING WORK
Filed Feb. 19, 1942
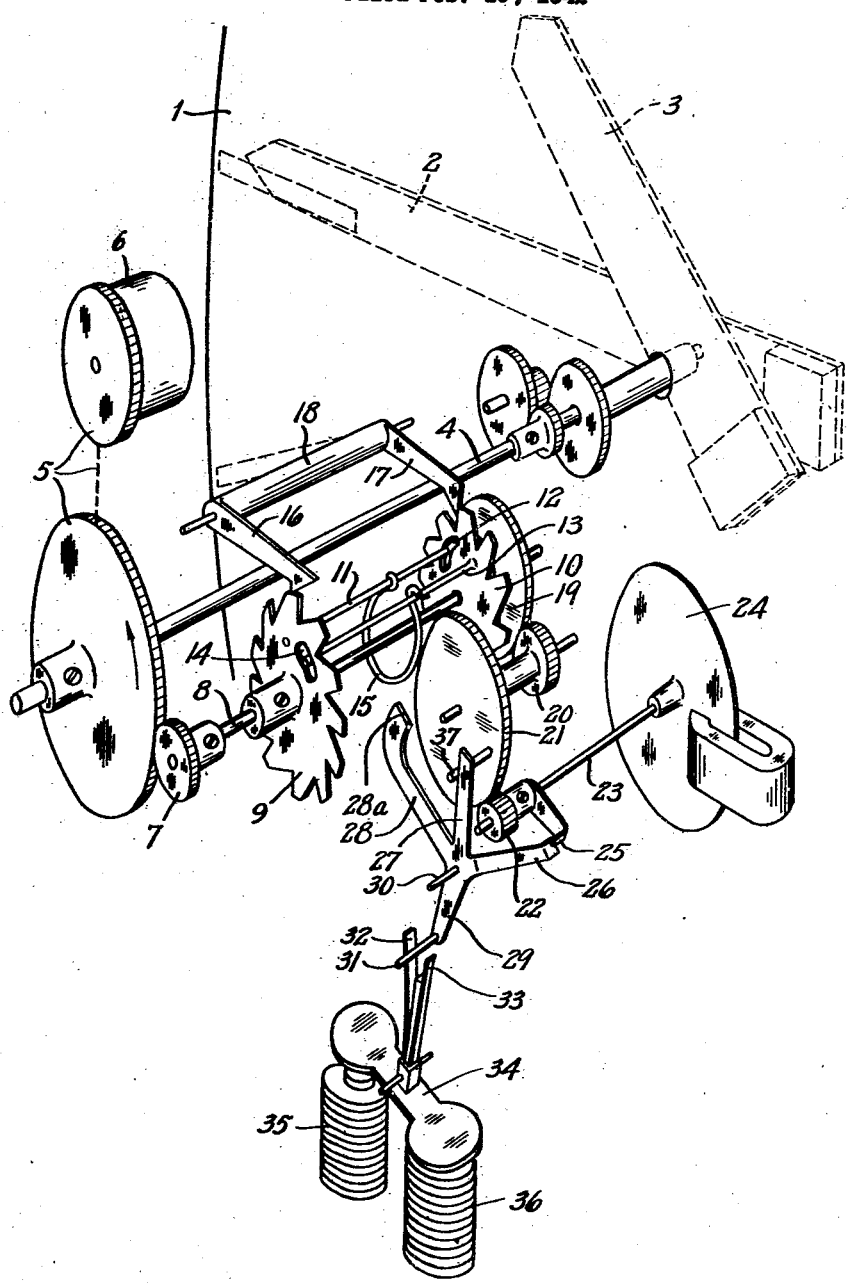

Patented Sept. 2, 1947

2,426,801

UNITED STATES PATENT OFFICE 2,426,801

MECHANISM WITH INTERMITTENT RELEASE OF A DRIVING WORK

Philipp Vannini, Zug, Switzerland, assignor to Landis & Gyr, A. G., a corporation of Switzerland Application February 19, 1942, Serial No. 431,463
In Switzerland June 28, 1941

8 Claims. (Cl. 58—7)

The present invention relates to a mechanism with intermittent release of its driving means, such as an outdoor tower or facade clock.

In such devices, additional momentums, and forces may arise interfering with the releasing means, and the structure of the device usually involves robust, intricate, space and power requiring means instead of light, plain, cheap and space-saving ones.

Let an outdoor facade clock be taken as an example, wherein such a contrivance can be applied. With such a clock it may easily occur that an external force, produced, for instance, by wind pressure on the hands, is added to the driving force of the hands whereby the whole driving force may grow to such an extent that the release system controlling the clock-train cannot act sensitively in case of the use of a controlling relay which would no longer act due to the great bearing pressure.

The object of the invention is to provide means in which the drawback described is eliminated. According to it in a device with intermittent release of a driving means, between the driving gear and the release medium, a connection is provided for absorbing any additional momentum or driving force which may arise. This connection may, for example, be a metallic spring. Further, the connection can be fitted with two ratchet wheels mounted on a common arbor and toothed in opposite ways, the pawls of which are rigidly interconnected. The stretching of the spring tends to keep the ratchet wheels in proper angular relationship for cooperation with the pawls. One ratchet wheel can be rigidly connected with the clock-work, the other ratchet wheel with the release medium.

The annexed drawing is a diagrammatic sketch of but one embodiment, a front clock incorporating the invention, wherein only those parts are shown which are necessary for the understanding of the invention and with the various parts spaced for clearness.

The clock is provided with a dial 1 and hands 2 and 3. The minute shaft 4 is connected through gearing 5—partly illustrated by dashed line—with a spring driving gear 6. Through gearing 5, 7 the minute shaft 4 and a countershaft 8, respectively, are driven. A ratchet wheel 9 is fixed to the shaft 8 and a ratchet wheel 10 is loosely mounted thereon, the teeth of said wheels facing in opposite directions. Each individual tooth is shaped so that its free end edge forms a portion of the circle of circumference of the wheel. A bar 11 is fixed on toothed wheel 9 engaging with its free end a slot 12 in wheel 10 and, vice-versa, a bar 13 is secured on toothed wheel 10 engaging with its free extremity a slot 14 in wheel 9.

A ring-shaped metallic spring 15 is thrust with its ends on the bars 11, 13, arranged so that the stretching action of the spring brings the bar ends to bear against the opposite ends of the slots 12, 14, maintaining thereby the ratchet wheels 9 and 10 in their proper angular relationship to each other. The pawl 16 cooperating with ratchet wheel 9 and the pawl 17 cooperating with ratchet wheel 10 are fast to each other and pivoted by shaft 18. The normal spacing of the teeth on ratchets 9 and 10, and the position of the engaging ends of pawls 16 and 17 is such that rotation of the ratchets 9 and 10 allows pawl 17 to drop, placing pawl 16 in position to engage a tooth on ratchet wheel 9 until ratchet wheel 10 lifts pawl 17 sufficiently to cause pawl 16 to clear the ratchet wheel 9. If the load is in the opposite direction, and the weight of the hands is tending to rotate ratchet wheels 9 and 10 in a counterclockwise direction, pawl 17 engages a tooth of ratchet wheel 10 and holds it even though ratchet wheel 9 is relatively moved against the compression of spring 15 exerted through the rods 11 and 13 on ratchet wheels 9 and 10.

The spring 15 and rods 11 and 13 connecting the same with the ratchet wheels 9 and 10 thus provide a resilient controlling device allowing independent movement of the wheels while maintaining them in proper angular relationship at all times for cooperation with their respective pawls 16 and 17.

Ratchet wheel 10 and gear 19 form a rigid assembly, the latter meshing with a pinion 20 which in turn, through gearing 21, 22, communicates with shaft 23. The latter bears a disc 24 of an electro-magnetic brake attachment, as well as a release finger 25 having a terminal nose portion. This nose cooperates with stop arm 26 of a four-armed rock lever 26, 27, 28, 29 which is pivotally mounted on axis 30 and controlled by a pin 31 secured on arm 29, the latter depending in turn for its action by leaf springs 32, 33, fitted to the armature 34 of a release relay having two coils 35, 36.

A pin 37, cooperating with the arm 27 and an inclined or cam face 28a of arm 28 is attached to gear 21, so that whenever the stop arm 26 moves into the path of the release finger 25, the arm 27 engages the pin 37, in which position of the parts, the inclined face 28a lies outside the orbital path of travel of pin 37. In this position the pressure of the spring driven clock gear 6 is transmitted successively to parts 5, 7, 8, 9, 15, 16, 19, 20, 21, 22, 23 and to release finger 25, the latter engaging thereby the stop arm 26. This blocks the device and consequently prevents the hands 2, 3 from turning.

When with normal driving force on the hands 2, 3 the release relay 34, 35, 36 is acted upon (starting from the position of the various parts as illustrated in the drawing) the armature 34 tilts towards coil 35 and causes the spring 33 to engage the pin 31, rocking thereby the lever 26—29 in such a way that release arm 25 is freed from arm 26, the arm 27 is moved away from pin 37 to allow gear 21 to rotate, and the arm 28 with the inclined end face 28a is moved into the path of motion of pin 37. Now the driving gear 6 causes the hands 2, 3 to move and upon rotation of the ratchet wheels 9, 10, the pawl 17 on its sliding up on top (back) of the next tooth of wheel 10 causes pawl 16 to move beyond range of the teeth of ratchet 9 after the latter had dropped into one of the tooth spaces of ratchet 9, i. e. before the top of the next tooth of ratchet 9 has arrived at the point to be engaged by pawl 16.

During the described motion of ratchet wheels 9, 10 and their pawls 16, 17, the release arm 25 has completed a few turns, during which the brake 24 prevents too quick a motion of the whole clock-train, and pin 37 in its travel contacts the inclined or cam face 28a of arm 28. Shortly before the gear 21 has completed half a revolution, the pin 37 reaches the inclined face 28a forcing arm 28 aside, whereby, under action of spring 33 the lever 26—29 swings back to its former position. The stop arm 26 thereupon arrests the release arm 25 and after the pawl 17 has dropped behind the next tooth of wheel 10, the whole clock-train is brought to a standstill.

Upon further actuation of the release relay 34—36 its armature tilts towards coil 36, the lever 26—29 being rocked in such a way that upon release of nose 25 from lever 26, its arm 27 is brought into the path of motion of pin 37. The latter, on having practically completed a turn, brings back the arm and hence the whole lever 26—29 into the original position.

If, for instance, an additional momentum such as wind pressure on the hands, 2, 3 takes place, then with the device at rest, the ring spring 15 is tensioned as the ratchet 9 is moved forward by the gearing 5, 7, while the ratchet wheel 10 is prevented from rotating by release arm 25, i. e. the bars 11, 13 are moved toward each other to increase the torque exerted by spring 15. At the same time the pawl 16 drops into the next tooth space of ratchet wheel 9. Should additional torque be able to overcome the force of spring 15, pawl 16 locks with the next tooth of 9 as it is no longer impeded by pawl 17 from doing so due to the locking of wheel 10 by arm 25.

Should an additional momentum take place during the running of the clockwork, i. e. during the movement of the hands 2, 3, then, due to the lead of ratchet wheel 9 with respect to ratchet wheel 10, the next tooth of 9 locks against pawl 16 before the pawl 17 is cammed to the top of the next tooth on the wheel 10 to raise 16 out of the path of said next notch. The additional torque thus again becomes limited in its effect on the release medium.

The ratchet wheel 10 acts in a well known manner as a check to reverse movement.

In the event that an external load is imposed on the clockwork tending to operate it in the opposite direction to its normal direction of movement such tendency will be overcome and prevented by the locking action of ratchet wheel 10 with pawl 17. The external load is thus prevented from affecting the release medium.

By suitably limiting the stretching force of spring 15 it is possible to predetermine the maximum bearing pressure on the release medium and hence the stress of the release arrangement.

It is understood that instead of a metallic spring any other elastic or flexible means, for instance a piece of rubber, may be utilized as an elastic connection between the ratchet wheels 9, 10.

Other modes of applying the principle of my invention may be employed instead of the one explained, changes being made as regards the mechanism herein disclosed, provided the means stated by any of the following claims or their equivalent be employed.

What I claim is:

1. In a driving mechanism having an intermittently operating release device, means for releasing the same for motion and locking it from motion at the end of a motion period, a driving gear, a gear train between the driving gear and release device, and a controlling device in the train for yieldingly opposing the driving means when locked and means operated by the lost motion device for locking the lost motion device against excessive movement when the release device is locked.

2. In a driving mechanism having an intermittently operating release device, means for releasing the same for motion and locking it from motion at the end of a motion period, a driving gear, a gear train between the driving gear and release device, and a controlling device in the train including a pair of relatively movable members and a resilient connection between the members loaded by the driving gear under an undue driving force thereon for effecting relative movement of said members, and means operative by such movement of said members for preventing excess pressure on the releasing means.

3. In a driving mechanism having an intermittently operable release device including an escapement wheel, an oscillatable escapement lever, means for intermittently operating said lever, and means including the lever for locking the escapement wheel from movement at the end of a motion period, a driving gear, a gear train between the driving gear and escapement wheel, means in said train including relatively movable members moved by said driving gear for locking the driving gear against undue motion and for limiting movement of the driving gear relatively to the escapement.

4. In a driving mechanism having an intermittently operating release device including an escapement wheel, means for releasing the same for motion and locking the same from motion at the end of a motion period, a drive gear, a shaft driven thereby, a countershaft, gearing between the driven shaft and countershaft and the latter and the escapement wheel, and a controlling device in said gearing including a pair of relatively movable members carried by and associated with the countershaft and a resilient connection between said members loaded by the drive gear and means operated by the relative movement of the members for limiting resilient movement of the members whereby excessive loading of the escapement release is prevented.

5. Mechanism of the character set forth in claim 1 wherein the controlling device comprises a shaft, ratchet wheels respectively fixed to and loosely mounted on the shaft, pawls controlling said ratchet wheels to permit them to have independent relatively limited rotation, connecting members between the ratchet wheels each having a lost motion connection with each wheel, and a resilient connection between said members adapted to be tensioned by movement of one of the ratchet wheels relative to the other.

6. Mechanism of the character set forth in claim 1 wherein the controlling device comprises a shaft, ratchet wheels respectively fixed to and loosely mounted on the shaft, pawls controlling said ratchet wheels to permit them to have independent relatively limited rotation, each of said ratchet wheels having teeth whose outer ends form portions of the circumference of the wheel so that the respective pawls normally engage the ends of the teeth and recesses between the teeth of the respective wheels, connecting members between the ratchet wheels each having a lost motion connection with each wheel, and a resilient connection between said members adapted to be tensioned by movement of one of the ratchet wheels relative to the other.

7. In a driving mechanism having an intermittently operating release device, means for releasing the same for motion and locking it from motion at the end of a motion period, a driving gear, a gear train driven by and interposed between the driving gear and release device, a controlling device in said train embodying relatively movable members relatively moved under an external driving force of the driving gear to lock the same from movement, resilient means in said train which may be loaded by the relative movement of said members, and means operated by the loading of the resilient means for preventing excessive pressure on the releasing means.

8. In a driving mechanism having an intermittently operating release device, means for releasing the same for motion and locking it from motion at the end of a motion period, a driving gear, a gear train driven by and interposed between the driving gear and release device, including a pair of relatively movable members, a resilient connection between the members loaded by relative movement of said members by the driving gear on an undue motion of said gear, and means operated by the relative movement of said members for limiting the pressure on the releasing means.

PHILIPP VANNINI.

REFERENCES CITED

The following references are of record in the file of this patent:

UNITED STATES PATENTS

| Number | Name | Date |
|---|---|---|
| 2,233,921 | Junghans | Mar. 4, 1941 |

FOREIGN PATENTS

| Number | Country | Date |
|---|---|---|
| 422,258 | Great Britain | Jan. 8, 1935 |